United States Patent [19]

Tanaka

[11] Patent Number: 5,545,025
[45] Date of Patent: Aug. 13, 1996

[54] COOLED PELLET MAKING MACHINE

[75] Inventor: Masaru Tanaka, Higashi Katsushi-gun, Japan

[73] Assignee: Katsu Manufacturing Co., Ltd., Chiba, Japan

[21] Appl. No.: 317,586

[22] Filed: Oct. 3, 1994

[51] Int. Cl.⁶ .................................................. B29B 9/06
[52] U.S. Cl. .............................. 425/315; 83/171; 83/950; 264/143; 264/148; 425/DIG. 230
[58] Field of Search .................................. 425/325, 308, 425/315, DIG. 230; 264/143, 148; 83/171, 950

[56] References Cited

U.S. PATENT DOCUMENTS

| | | | |
|---|---|---|---|
| 3,634,570 | 1/1972 | Himelreich, Jr. et al. | 264/143 |
| 4,413,965 | 11/1983 | Kinoshita et al. | |
| 4,838,775 | 6/1989 | Hunke | 425/71 |
| 5,066,210 | 11/1991 | Hunke | 425/308 |
| 5,146,822 | 9/1992 | Noda et al. | 425/71 |
| 5,186,959 | 2/1993 | Tanaka | |

FOREIGN PATENT DOCUMENTS

| | | | |
|---|---|---|---|
| 54-52161 | 4/1979 | Japan | 264/143 |
| 54-52164 | 4/1979 | Japan | 264/143 |
| 62-270306 | 11/1987 | Japan | 425/308 |
| 4-69212 | 3/1992 | Japan | 425/308 |
| 4-189107 | 7/1992 | Japan | 264/143 |
| 5-345317 | 12/1993 | Japan | 264/143 |
| 2080182 | 2/1982 | United Kingdom | 264/143 |

*Primary Examiner*—Jay H. Woo
*Assistant Examiner*—Joseph Leyson
*Attorney, Agent, or Firm*—Wenderoth, Lind & Ponack

[57] ABSTRACT

A cooled pellet making machine includes a rotary cutter and a fixed blade mounted on a fixed support table in opposition to the rotary cutter for cutting a strand into pellets. Each of the fixed support table and the fixed blade are provided with a communication chamber having an inflow port formed in one end and an outflow port formed in the other end. The communication chamber of the fixed blade is connected with the communication chamber of the fixed support table. Cooling water may be circulated through the communication chamber to eliminate heat from being generated on the fixed blade. Therefore, the strand may be cut in a cooled condition by means of the rotary cutter, to produce pellets of uniform size.

3 Claims, 5 Drawing Sheets

COOLED PELLET MAKING MACHINE

BACKGROUND OF THE INVENTION

1. Field of the Invention

The present invention relates to a cooled pellet making machine for producing resin pellets from a strand by cutting the strand with a rotary cutter and a fixed blade. The strand is molded in a linear configuration utilizing a die mounted on a head of an extruder.

2. Description of the Prior Art

Conventionally, in this type of pellet making machine, pellets are produced by cutting a strand which has been cooled. However, resin materials may stick to the rotary cutter and the fixed blade since the temperature of the rotary cutter increases during a cutting operation, thereby impairing the cutting effect which may result in pellets of non-uniform sizes. Furthermore, static electricity is generated which causes the pellets to adhere to each other.

Therefore, a solution has been proposed, wherein a strand is caused to pass through a cooling water layer and when cooled sufficiently, the strand is cut into pellets by means of the rotary cutter. The hot resin pellets are thrown into a cooling water tank following the cutting operation.

However, when the strand cutting operation is started, the pellets may not be uniform in shape which may lead to rejectable products.

In view of the above-described background, the inventor of the present invention has proposed a solution in U.S. Pat. No. 5,186,959, in which cooling water is poured into and allowed to circulate through a rotary cutter in order to prevent the rotary cutter from generating heat and causing the resin material to adhere to the surface of the rotary cutter.

In the prior art approach and the like, when the strands are of relatively large diameter, the strands are subject to relatively less adverse effects as a result of deformation which occurs under expansion and bending etc. even if the fixed blade and the fixed support table are heated in a pellet making operation of making pellets. However, a recent trend is to produce super mini-sized pellets. Strands in diameter ranging from 0.3 mm to 0.7 mm are currently cut to produce super-mini sized pellets.

As a consequence, in the case of a strand having an especially reduced diameter, strands which have been fed through the feed roll may soften due to the heat in front of the rotary cutter, or fluctuate and vibrate when they are subject to a slight wind pressure or vibratory motion from the electric motor. Thus, the strand may be cut in irregular configurations, thereby preventing precision cutting and resulting in worthless products of non-uniform size.

SUMMARY OF THE INVENTION

To solve the above-described problems in the prior art, it is a principal object of the present invention to provide a pellet making machine adapted to produce pellets of uniform dimensions, wherein the fixed blade and the fixed support table may be cooled by providing an internal chamber in which cooling water may be circulated to reduce heat generated by the strand during travel on the roller and heat generated by the main frame in order to prevent the strand from thermally expanding.

In accordance with the present invention, the cooled pellet making machine includes a housing in which an electric motor is included, a pellet discharge trough or chute provided below the housing and through which pellets may be discharged, a rotary cutter provided in an upper portion of the housing to cut a strand fed between a feed roller and a pressure roller, and a fixed blade operatively disposed relative to the rotary cutter, wherein the machine further includes a fixed support table, upon which said fixed blade is mounted, and which is formed from a longitudinal member substantially in a L-shaped cross-section, an internal longitudinal communication or cooling chamber formed in the fixed support table, an inflow port and an outflow port bored in opposite sides of the chamber so that water may be circulated into the fixed support table through the chamber.

According to the present invention, the fixed blade is formed substantially in a rectangular or square configuration in the longitudinal direction. The fixed blade includes an engagement groove formed in an upper surface of the fixed support table. A blade is provided on the leading edge of the fixed blade and at least one or a plurality of internal communication chambers are provided, each having an inflow port and an outflow port in opposite sides of the communication chamber and so that feed water may be circulated into a fixed blade through the communication chamber.

According to the present invention communication chambers may be provided in the fixed support table and in the fixed blade. The communication chambers allow feed water to be circulated via a communication port, so that feed water may circulate from the inflow port to the fixed support table and the fixed blade.

BRIEF DESCRIPTION OF THE DRAWINGS

The accompanying drawings illustrate one embodiment of the cooled pellet making machine of the present invention, wherein.

DETAILED DESCRIPTION OF THE PREFERRED EMBODIMENT

The cooled pellet making machine of the present invention will be described hereinbelow, with reference to accompanying drawings.

Figure 1:
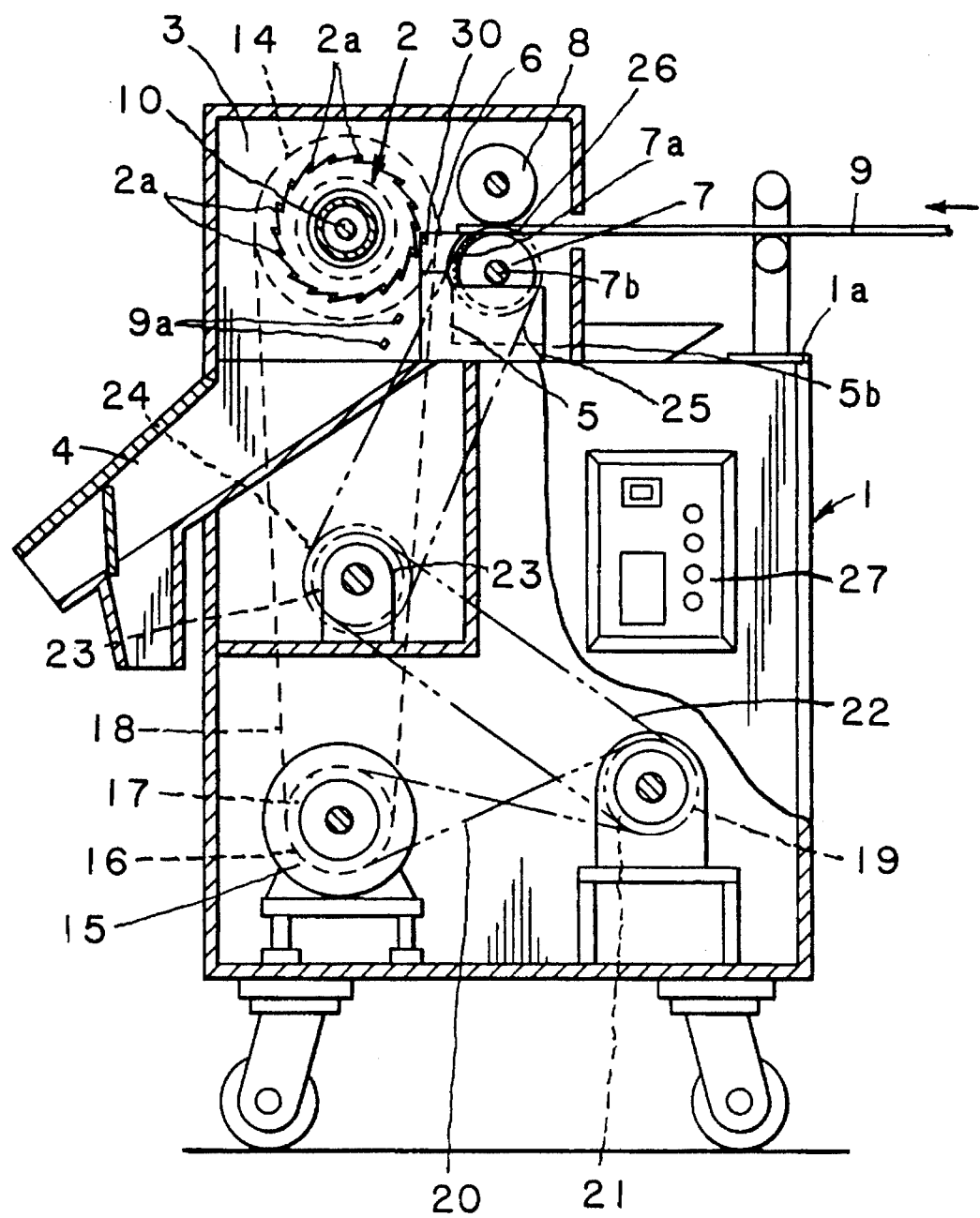
FIG. 1 is a front elevation of the cooled pellet making machine of the present invention with a portion thereof removed to reveal the internal components.

In FIG. 1, a reference numeral 1 represents a pellet making machine frame having an upper portion provided with a housing 3 containing a rotary cutter 2. The housing 3 is connected to a pellet discharge trough 4 of U-shaped cross-section which is inclined downwardly from the lateral direction. The housing 3 includes a fixed support table 5 and a fixed blade 6 which is mounted on the fixed support table 5. Moreover, the rotary cutter 2 is rotatably mounted adjacent the fixed blade 6.

The fixed blade 6 is provided at the discharge side of a metal feed roller 7, which has a rough peripheral surface 7a. A pressure roller 8 is located in such a position so as to oppose the upper portion of the metal feed roller 7. A strand 9 is fed to the rotary cutter 2 and fixed blade 6 by means of rollers 7 and 8 so that the strand may be cut into pellets.

The rotary cutter 2 is rotatably supported by a shaft 10 and has edges 2a made from a super-hardened alloy. The edges 2a are coupled with the tips of the teeth on the circumferential surface of cutter 2. Furthermore, the fixed support table 5 has a fixed blade 6 mounted in opposing relationship relative to the rotary cutter 2 and has the same longitudinal dimensions as that of the fixed blade 6. The fixed support table 5 has a lateral wall on opposite sides, and is formed substantially in a L-shaped configuration in vertical cross-section. The table includes a vertical strip 5a and a horizontal table 5b which is fixed on the base plate 1a of frame 1.

Figure 2:
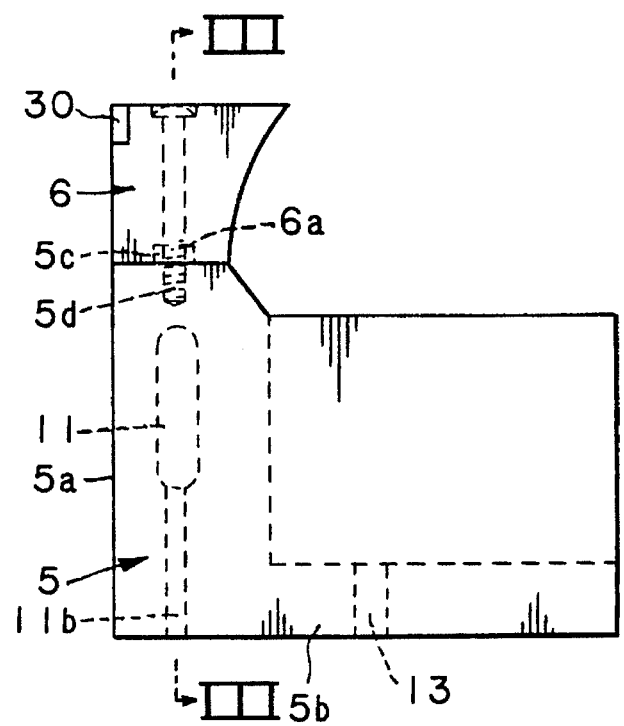
FIG. 2 is a side elevation showing the fixed blade and the fixed support table upon which a cooling chamber is provided.
Figure 3:
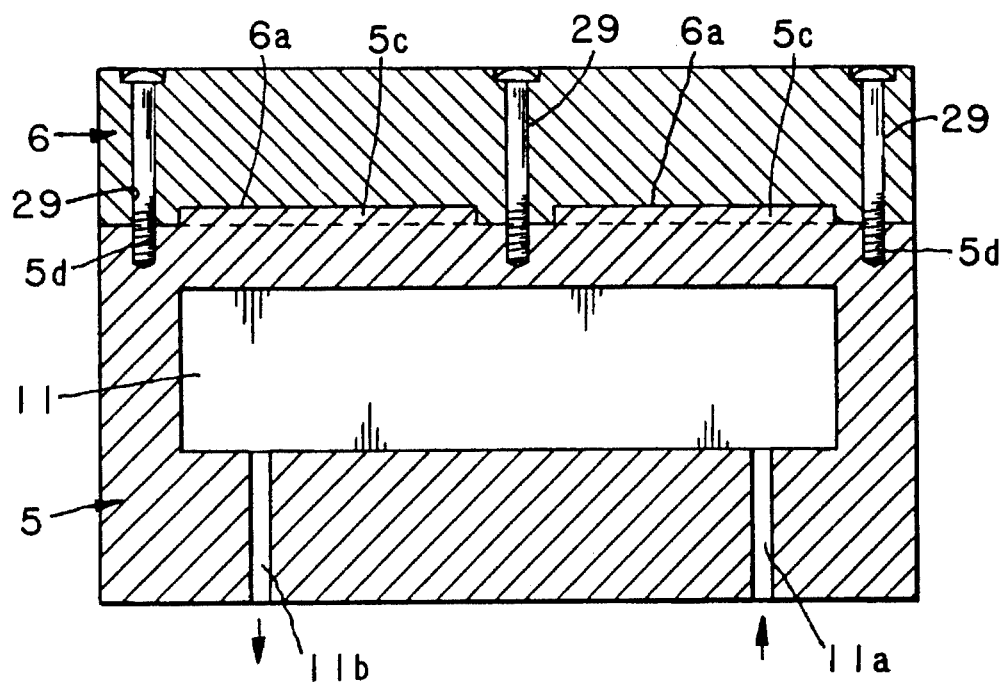
FIG. 3 is a vertical cross-sectional view taken along line III—III in FIG. 2.

In FIG. 2 and FIG. 3, the vertical strip 5a of the fixed support table 5 is provided with an internal longitudinal communication chamber 11, through which feed water may be circulated. The communication chamber 11 is provided at one end with an inflow port 11a and at an opposite end with an outflow port 11b for ensuring water circulation. The inflow port 11a and outflow port 11b are connected to a circulation pump (not shown) through respective water feeding pipes.

The vertical strip 5a is provided with an engagement portion 5c which extends upwardly in single or dual strips. The engagement portion 5c is formed so as to be engageable with an engagement groove 6a formed in the fixed blade 6. Threaded holes 5d are bored in the upper portion of the vertical strip 5a in a predetermined location for mounting the fixed blade 6 to the fixed support table 5 by means of threaded rods.

A plurality of threaded holes 13 are formed in the horizontal table 5b for securing the horizontal table 5b to the base plate 1a of the frame 1. A fastener means such as a set bolt etc. is used to secure the horizontal table 5b in position.

Description will now be made as to the manner in which the movements of the rotary cutter and the feed roller are transmitted.

A V-pulley 14 is provided on the shaft 10 of the rotary cutter 2. This V-pulley 14 is connected by means of a V-belt 18 with a V-pulley 16 provided on the electric motor 15 which is in turn mounted on the frame 1 so that the V-pulley 14 is driven by electric motor 15 to impart rotary motion to the rotary cutter 2. A V-pulley 17 on the electric motor 15 is connected by a V-belt 20 with a V-pulley 19. A V-pulley 21 provided on the shaft of the V-pulley 19 is coupled by a V-belt 22 with a V-pulley 23. A V-pulley 24, provided on the shaft of the V-pulley 23, is communicated by a V-belt 25 with a V-pulley 26 provided on a shaft 7b of the feed roller 7, thereby allowing the feed roller 7 to impart rotary motion in the direction in which the strand is fed. The front surface of frame 1 is provided with a control board 27 which may actuate electric motor 15.

Figure 4:
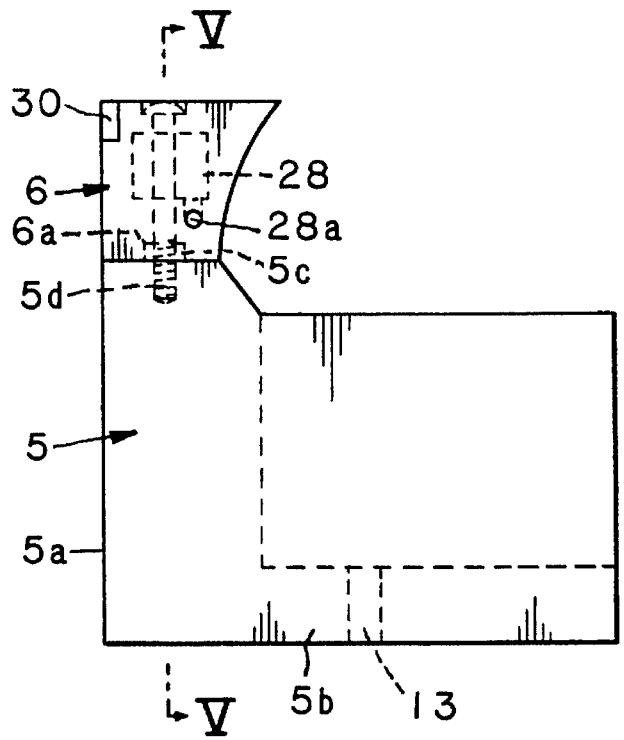
FIG. 4 is a side elevation showing the fixed support table and the fixed blade within which the cooling chamber is provided.
Figure 5:
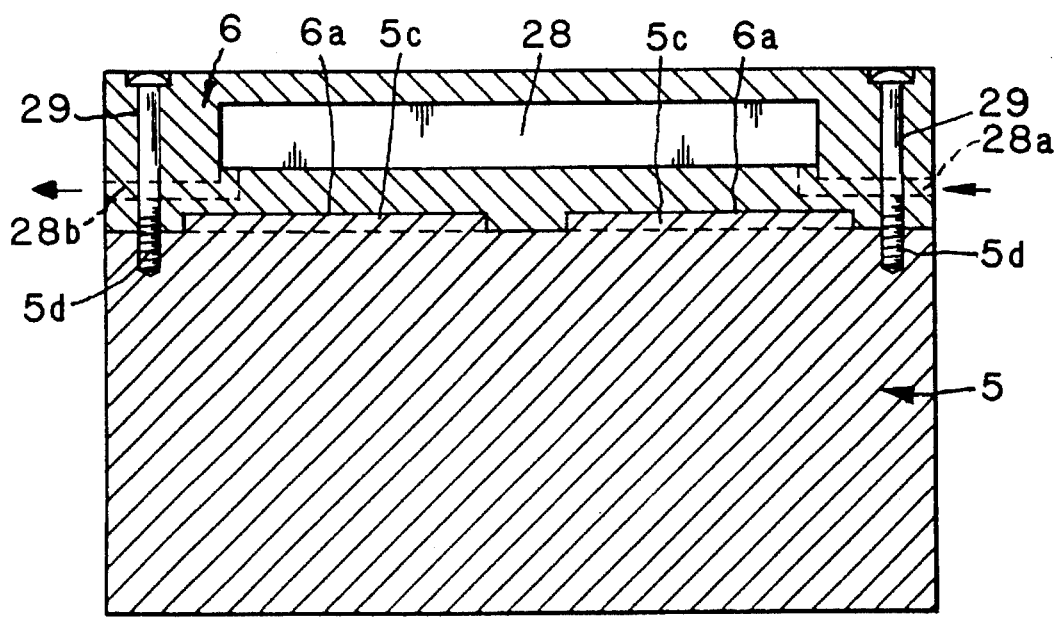
FIG. 5 is a vertical cross-sectional view taken along line V—V in FIG. 4.
Figure 6:
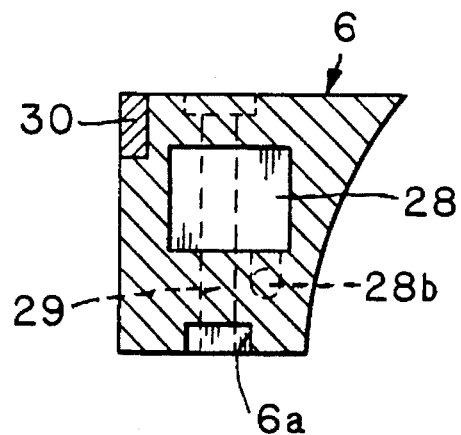
FIG. 6 is a vertical side view showing the fixed blade.

FIG. 4 to FIG. 6 illustrate an embodiment in which the fixed blade is provided with a cooling mechanism.

The fixed blade 6 has an engagement groove 6a formed in a longitudinal direction on the bottom surface for engagement with the engagement portion 5c defined in the upper surface of the fixed support table 5. The fixed blade 6 is also formed of substantially equal dimensions with those of the fixed support table and substantially in a rectangular cross-section configuration in a longitudinal direction. The fixed blade 6 includes at least one internal communication chamber 28 for circulating feed water. The communication chamber 28 is provided at one end with an inflow port 28a and at an opposite end with an outflow port 28b. The fixed blade 6 is provided with threaded holes 29 in the upper surface for securing the blade on the fixed support table 5. The fixed blade 6 has an edge 30 which is made from a super hardened alloy which is integrally embedded in the leading edge of the upper surface. Thus, multiple strands are fed through the pressure roller 8 and the feed roller 7 and are subsequently cut into pellets 9a by the rotary cutter 2. If the strand has dimensions in the range of 0.3 mm, for example, a slight wind pressure may be created under an elevated temperature and vibration from the frame 1, the electric motor 14 and the like. As the strand, which has been cooled down, passes over the fixed blade 6 by means of feed roller 7 and the like, it is possible for such a strand to soften or fluctuate causing the strand to be cut non-uniformly during the cutting operation. In the present invention, water circulating in the communication chambers prevents an elevated temperature on the fixed blade, thereby allowing pellets to be produced while the strand is in a cooled condition.

Figure 7:
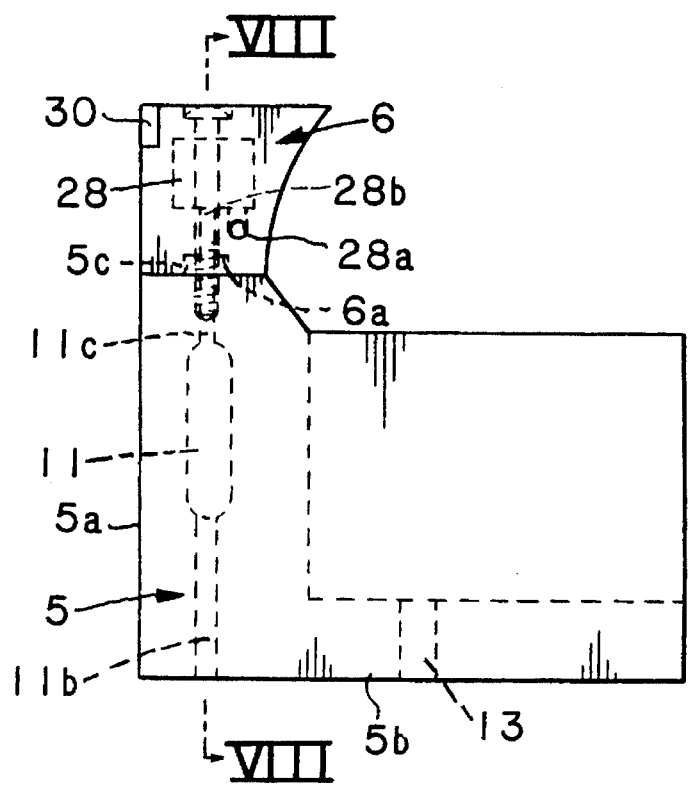
FIG. 7 is a side view showing the fixed blade and the fixed support table within which cooling chambers are provided for establishing communication therebetween.
Figure 8:
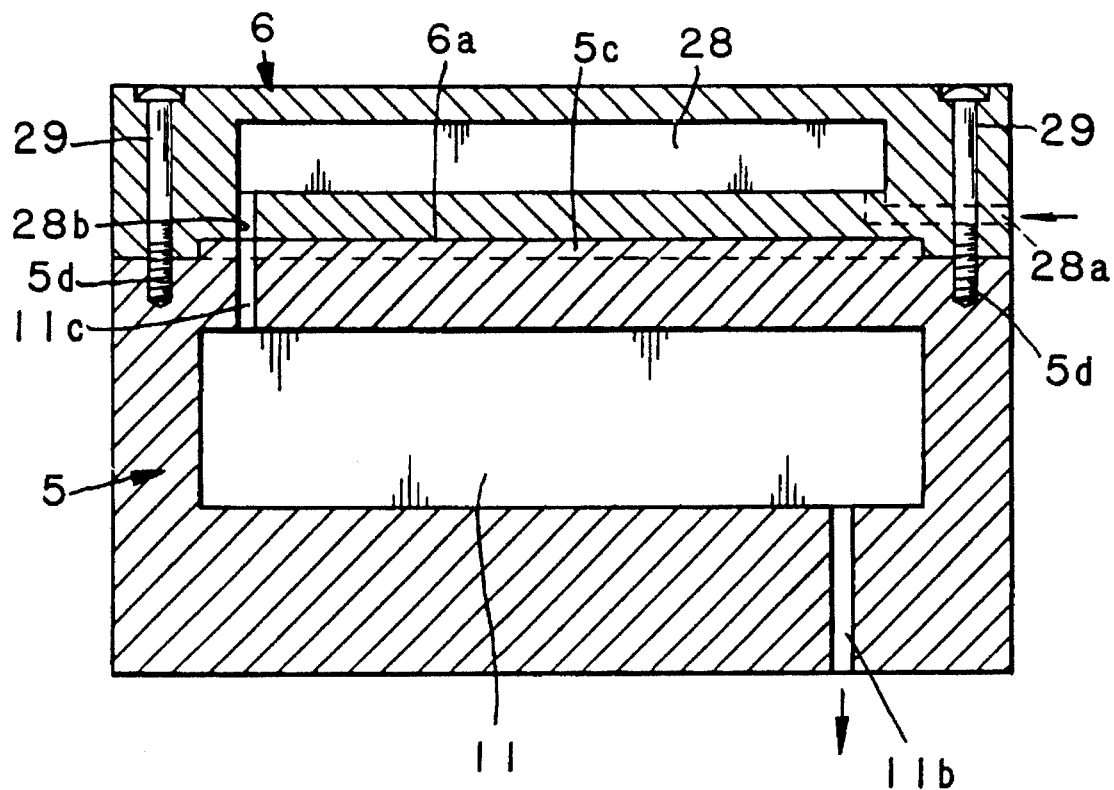
FIG. 8 is a vertical cross-sectional view taken along line VIII—VIII in FIG. 7.

FIG. 7 and FIG. 8 illustrate an alternative embodiment in which the fixed support table 5 and the fixed blade 6 are provided with the cooling mechanism. The fixed blade 6 is provided with an internal communication chamber 28 and the fixed support table 5 is provided with an internal communication chamber 11. An outflow port 28b, formed in one end of the communication chamber 28, is connected to a communication port 11c defined in one end of the communication chamber 11 in the fixed support table 5. An inflow port 28a is formed in other end of the communication chamber 28 in the fixed blade 6.

An outflow port 11b is defined in the opposite end of the communication chamber 11 so that feed water from the inflow port 28a may be circulated through the outflow port 28b and communication port 11c via the communication chamber 28 into the communication chamber 11 and may flow from the outflow port 11b of the communication chamber 11 to cool the fixed blade 6 and the fixed support table 5.

The present invention is constructed as above-described, and provides several advantages as described below. First, the fixed support table or the fixed blade, or alternatively the combination of the fixed support table and the fixed blade may be easily cooled down. Secondly, neat and uniform pellets may be produced without irregular dimensions since the strand, which has been fed in reduced dimensions, may maintain a reduced temperature despite the presence of heat, vibration and wind pressure etc., and thus the strand may be cut precisely. Thirdly, since the advancing strand has a reduced temperature, the rotary cutter may generate less heat resulting in less failures or other troubles which may occur due to heat on the fixed blade, and ensuring a remarkably improved cutting effect. Since the fixed support table is formed with an internal longitudinal communication chamber, it is possible to provide a cooling system having reduced dimensions, eliminating the need of installing a separate cooling device outside of the machine. Additionally, since the feed water is constantly circulated through the inflow port and the outflow port, both defined in opposite ends of the communication chamber, a substantially improved cooling effect is achieved.

Furthermore, the engagement portion on the longitudinal upper portion of the fixed support table provides a reliable engaging connection between the fixed support table and the fixed blade, thereby preventing conduction of heat from the fixed support table to the fixed blade and production of variant pellets due to thermal effects.

What is claimed is:

1. A pellet making machine comprising:

a housing;

a motor provided in said housing;

a rotary cutter provided in said housing and operatively connected to said motor;

a fixed support table mounted in said housing and having an internal cooling chamber formed therein;

a fixed blade mounted on said support table adjacent said rotary cutter, said fixed blade having an internal cooling chamber formed therein in fluid flow communication with said internal cooling chamber formed in said fixed support table;

an inflow port formed in said fixed blade and communicating with said fixed blade internal cooling chamber; and an outflow port formed in said support table and communicating with said support table internal cooling chamber, whereby water may circulate through said fixed blade into said fixed support table via said internal cooling chambers.

2. The pellet making machine as claimed in claim 1, wherein said fixed blade includes a bottom surface having at least one groove and said fixed support table includes an upper surface having at least one projection, wherein said at least one projection engages said at least one groove.

3. The pellet making machine as claimed in claim 1, further comprising a pellet discharge chute provided below said housing.

* * * * *